United States Patent

[11] 3,557,981

| [72] | Inventor | Shaun A. Seymour<br>Ephrata, Pa. |
|---|---|---|
| [21] | Appl. No. | 802,461 |
| [22] | Filed | Feb. 26, 1969 |
| [45] | Patented | Jan. 26, 1971 |
| [73] | Assignee | Sperry Rand Corporation<br>New Holland, Pa.<br>a corporation of Delaware |

[54] LIQUID MANURE PUMP TRANSPORT DEVICE
8 Claims, 3 Drawing Figs.

[52] U.S. Cl. .................................................. 214/146.5,
214/3, 214/506
[51] Int. Cl. .................................................. B66c 23/00
[50] Field of Search .......................................... 214/146.5,
3, 506; 173/28; 103/218; 230/38

[56] References Cited
UNITED STATES PATENTS

| 1,668,327 | 5/1928 | Manning | 173/28X |
| 1,973,325 | 9/1934 | Berger | 103/218X |
| 1,976,160 | 10/1934 | Coplen | 214/3 |

Primary Examiner—Albert J. Makay
Attorneys—Joseph A. Brown, John C. Thompson, James J. Kennedy and George C. Bower ABSTRACT: A liquid manure pump transport device comprising a chassis structure, a support means pivotally mounted on the chassis structure, said support means having ground engaging wheels mounted thereon, and hydraulic means connected between the chassis and the support means for pivoting support means with respect to the chassis structure between a transport position and an operable position wherein the wheels are lifted off the ground and the support means form a stable platform for locating a pump in a liquid manure pit when the device is in the operable position.

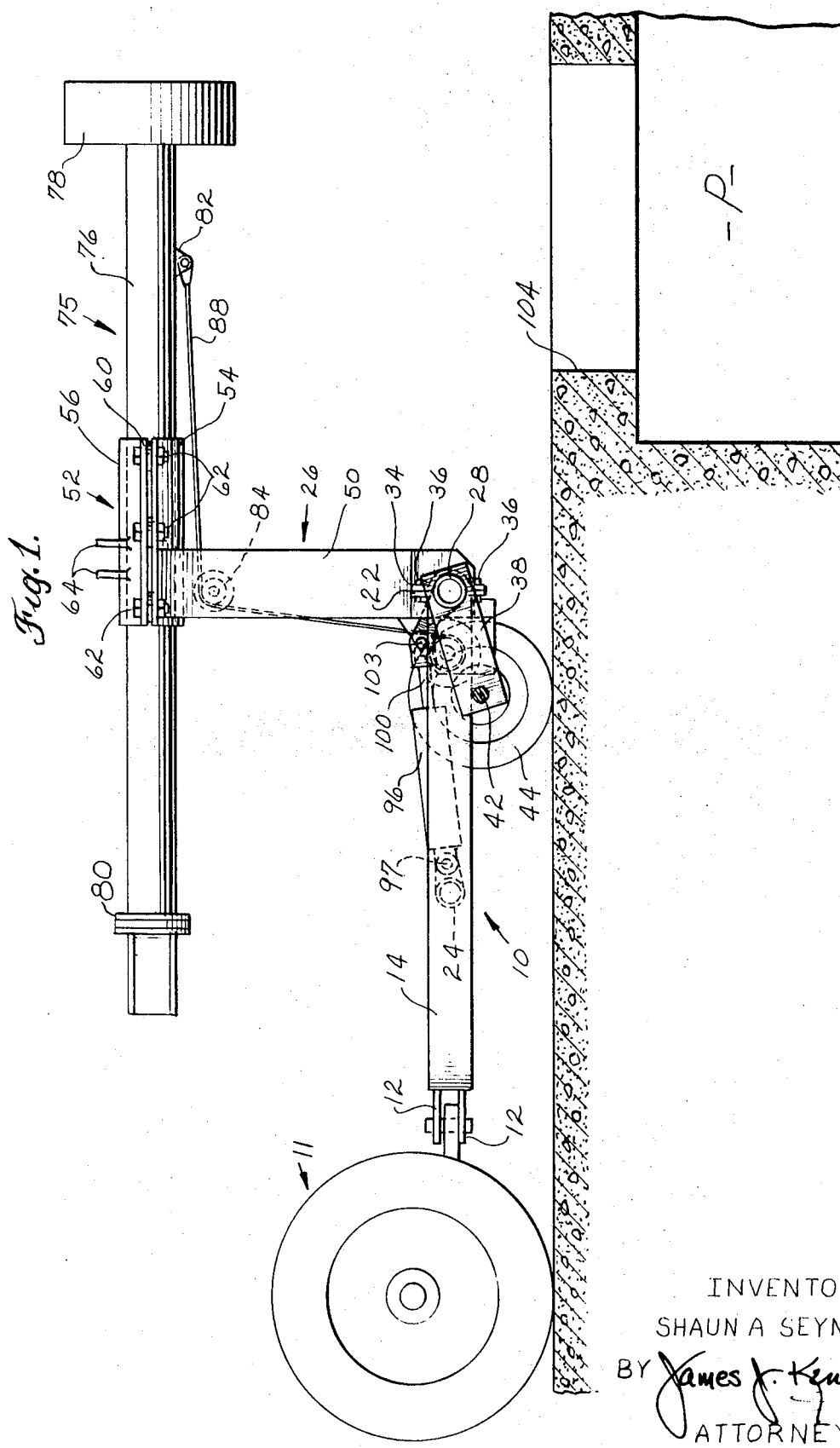

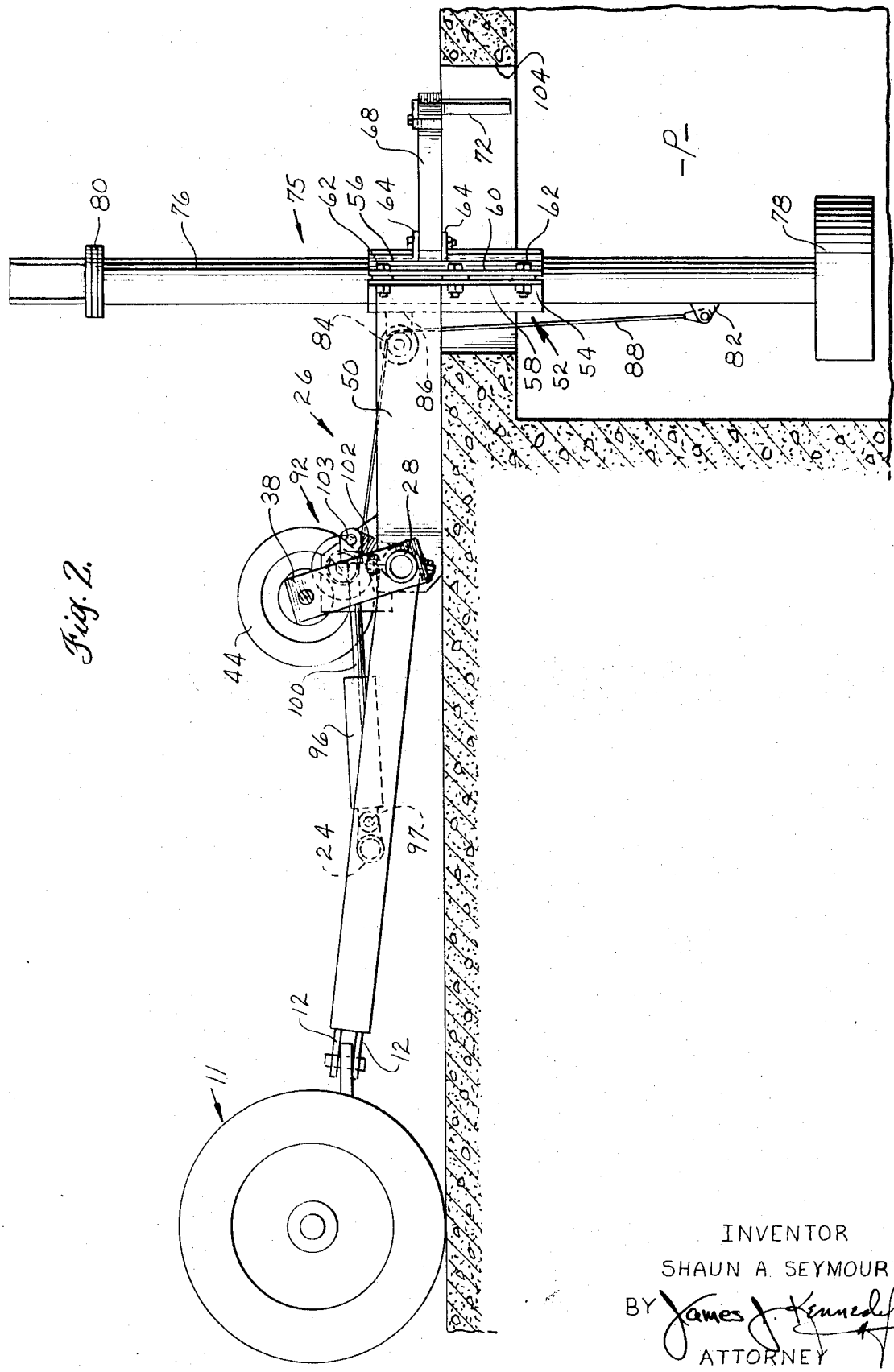

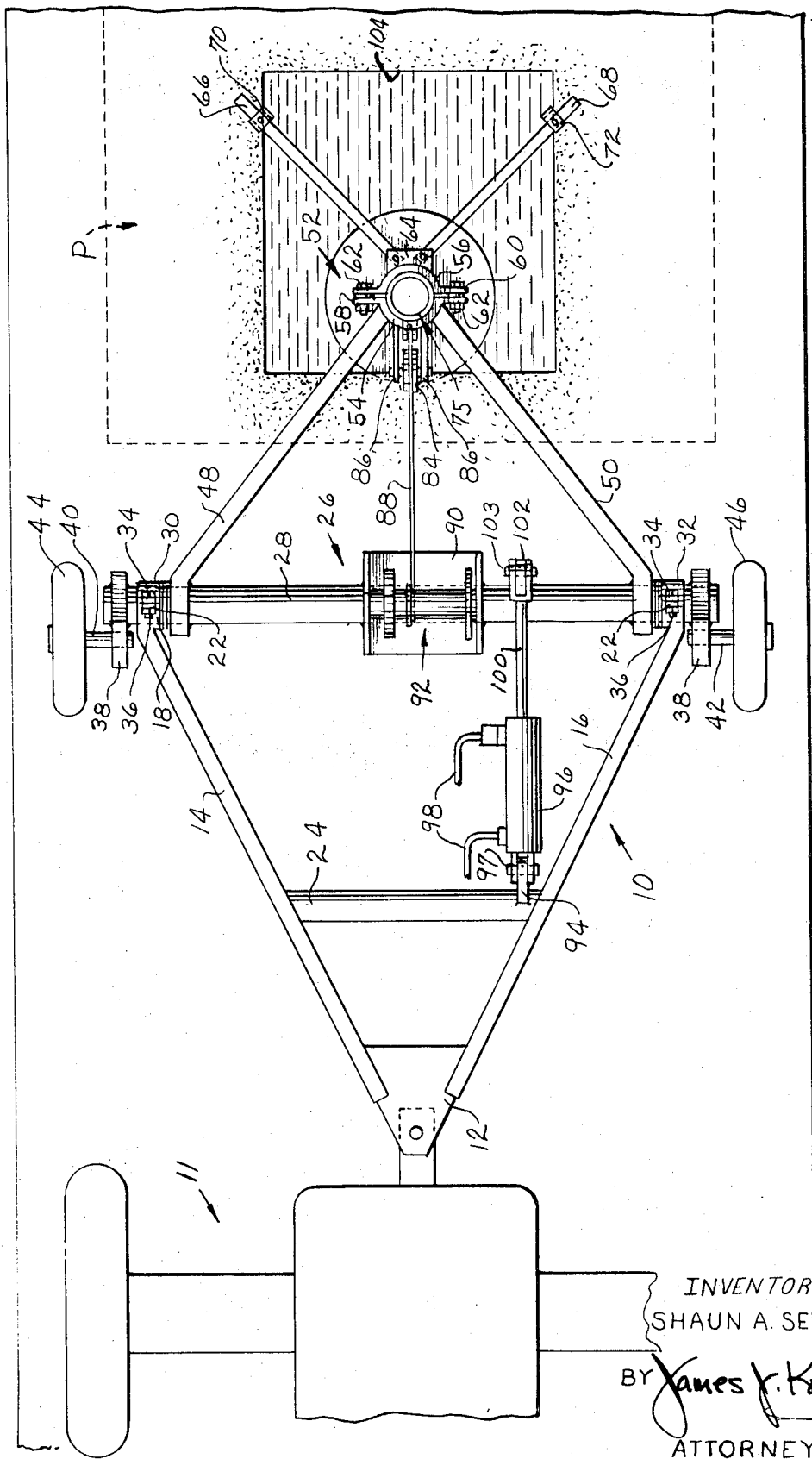

3,557,981

LIQUID MANURE PUMP TRANSPORT DEVICE

BACKGROUND OF THE INVENTION

This invention relates generally to transport trailers, or the like, and specifically to a pump trailer to be used in and about a farm for pumping liquid manure from a storage pit into a suitable transport, or spreading vehicle.

With the increase in farm mechanization, many farmers have been turning from the generally time consuming chore of manure handling on a daily basis. Using previously available facilities and devices, every farmer who had a large dairy, or other farm animal herd had to dispose of the solid manure waste on a daily basis. This meant that he had to take the time to clean out the barns, load the manure into a suitable spreader, transport the solid manure in the spreader to a discharge point, usually adjoining fields, emptying the spreading vehicle by distributing the solid manure on the ground and returning for another load. New practices, however, have made it possible for the farmer to eliminate this daily task and change from a solid type manure handling system to a liquid manure handling system. In this way, the farmer need only wash and scrape the manure into storage pits generally located under the barn, or adjacent thereto. The pits are large enough to store this slurry material for several days, weeks, or even months, if necessary. In this way, the farmer can arrange a schedule of manure spreading which would be more convenient and more timely, by simply pumping the slurry manure up out of the storage pits into a suitable spreading container.

In most cases, the storage pits are covered except for access holes, or hatchways, and the liquid manure pumps are submerged in the slurry of manure only at the time that pumping is to actually take place. The pumping units developed to handle this liquid manure, are rather cumbersome and heavy devices which required some type of a wheeled support to permit convenient placement of the pump units into the pits. Various types of trailers, or dollies, have been designed to permit the transport of the pump units and to facilitate placement of the pump in the pit. There are several problems, however, in placing such liquid manure pumps into a pit from a transport device, and stabilizing it during the operation. A conventional rubber wheeled trailer does not present the most stable platform from which to locate the pump in the pit and from which the pump is supported during operation. Because of the motion of the pump, the trailer will be caused to vibrate up and down as well as back and forth. Prolonged instability of this type will result in damage not only to the pump and the trailer, but also to the pit opening. It has also been found, using conventional wheeled trailers, that as the pump is swung from a stored or transport position to the vertical operating position, it is very difficult to position the pump unit in a true vertical position. This is caused by the position the trailer must assume with respect to the pit opening. It is impossible to move the trailer to the position right at the edge of the pit to permit true vertical placement of the pump unit in the pit. Additional drawbacks have been found inasmuch as the pump unit is a rather elongated device and when it is pivoted about the axle of the trailer, the opening of the pit must be very large in order to permit the pump unit to clear the edges of the openings to pivot to the upright, or vertical position. The large opening in the pit, in addition to being hazardous, presents limiting factors to the capacity of the pit.

SUMMARY OF THE INVENTION

Accordingly, the "kneeling trailer" design of the present invention overcomes a majority of the heretofore encountered problems. During transport, the offcenter relation of the transport wheels gives adequate ground clearance for normal moving operations. Upon arrival at a pit opening, operation of a hydraulic cylinder pivots the offset wheels upward dropping the axle of the trailer, resulting in easier penetration into the pit by the pump unit through the opening. Upon termination of the cylinder stroke, the transport frame which is located on the axle, is placed against the pit top providing a stable mounting arrangement not dependent on tire friction and pressure.

It is, therefore, a principle object of this invention to present a transport vehicle for a liquid manure pump which will provide a stable mounting platform for a pump unit during transportation and during operation of the pump upon its penetration into the pit opening.

Another object of the invention, is to provide radially extending arms and stabilizing tabs on the support unit to provide additional support and rotational stability.

Another object of the present invention is to provide winch means on the transport device which will permit raising and lowering of the pump unit with respect to the transport device and the pit so that the pump unit may be variably vertically positioned with respect to the bottom of the pit.

A further object of the invention is to provide hydraulic means which will pivot from the transport position to the vertical operating position.

These and other objects of the invention will become more readily apparent from the complete specification and the following appended claims.

BRIEF DESCRIPTION OF THE DRAWINGS

FIG. 1 is a side elevational view of a liquid manure pump unit transport device, showing the pump unit in the transport position;

FIG. 2 is a side elevational view of the transport device illustrating the position of the device with the the pump unit supported in its upright or operative position in a liquid manure tank; and FIG. 3 is a plan view of the transport device, as shown in FIG. 2.

DESCRIPTION OF THE PREFERRED EMBODIMENT

Referring now generally to the drawings and specifically to FIGS. 1 and 3, the liquid manure pump transport device is provided with a chassis structure 10 which is adapted to be towed behind a tractor 11, or other powered vehicle. The class structure 10 includes a pair of spaced apart, parallel, triangularly shaped hitch plates 12 which form the connecting means for the chassis to the tractor, and a pair of longitudinally extending, rearwardly diverging channel members 14 and 16. The channel members 14 and 16 are fixed by their forward converging ends to the hitch plates 12. The rearward ends of the channels 14 and 16 are provided with arcuate bearing surfaces 18 and 20, respectively. A plurality of mounting ears 22 extend outwardly from the bearing surfaces. A transverse chassis support 24, in the form of a tubular beam, extends between the channel members intermediate the ends thereof.

A pump support means 26, pivotally mounted at the rearward portion of the chassis structure 10, includes a horizontally extending axle 28 which is clamped to the rear ends of channels 14 and 16 by means of clamps 30 and 32. The clamp members 30 and 32 also are arcuately shaped to provide a bearing surface for the axle 28 and the clamps are further provided with ears 34 which, with bolts 36, cooperate to clamp the axle, in pivotal relation, to the ends of the channel members. The bolts 36 pass through suitable apertures in the ears 22 and 34, as illustrated in FIGS. 1 through 3.

The support means 26 is also comprised of a pair of arm members 38, outwardly extending leg means 48 and 50 and collar means 52. The arm members 38 form wheel mounting means and are fixed in spaced apart relation by one end to the outer ends of the axle 28. The arms extend radially outwardly from the axle and stub shafts 40 and 42 are mounted in the radial outer ends of the respective arms. The stub shafts 40 and 42 extend horizontally outwardly of the arms, the axes of the shafts being generally parallel with the axis of the axle. Left and right hand ground engaging wheels, or tires 44 and 46 are mounted for rotation on the stub shafts 40 and 42, respectively.

The leg means 48 and 50 are fixed to the axle 28, intermediate the ends thereof, in spaced apart relation, as shown in FIG. 3. The legs converge at their outer ends and are fixed to collar means 52. The collar means 52 is comprised of a split collar assembly having a first half 54 and a second half 56. The first collar half 54 is provided with outwardly extending flanges 58 and the second collar half 56 is provided with outwardly extending flanges 60. A plurality of bolts 62, or other suitable connecting means, are provided to fix the two collar halves together with the pump unit 75 disposed in slidable relation therebetween.

The second collar half 56 is further provided with a pair of spaced apart, rearwardly extending flanges 64 which form a mounting means for radially outwardly extending arms 66 and 68. The arms 66 and 68 are pivotally connected by their inner ends between the flanges 64 and each arm 66 and 68 is provided with adjustably positionable stabilizing tabs 70 and 72, respectively. The function of the stabilizing arms and tabs will be more fully described in detail hereinafter.

The pump unit 75, adapted to be submersed in a manure pit P, is comprised of an elongated tubular shaft portion 76, having a pump head 78 fixed to one end, and a collar portion 80. A bracket 82 is fixed to shaft 76 adjacent its lower end.

The first collar half 54 is provided a pair of spaced apart, inwardly extending brackets 86 which are adapted to mount a pulley 84 in rotatable relation therebetween. A cable, or rope 88 is fixed by one end to the bracket 82 on the pump shaft and extends upwardly therefrom over the pulley 84 to a winch means 92 which is mounted on a platform 90 fixed to axle 28. The winch 92 may be a handcranked or power operated. Once the pump unit 75 has been placed in the pit P by the transport device, the winch may be operated to adjust the vertical position of the pump unit with respect to the device and the manure pit. A more complete description will be made hereinafter.

A mounting bracket 94 is suitably fixed to and extends from frame member 24, intermediate the ends thereof. A hydraulic cylinder 96 is pivotally connected by pin 97 to the bracket 94, as shown in FIG. 3. Piston rod 100 of cylinder 96 is pivotally connected to a mounting bracket 102 by a pin 103. The bracket 102 is secured by suitable means such as welding, or the like, to pivotal axle 28. Hydraulic fluid is supplied to and returned from the cylinder through lines 98 which are, in turn, suitably connected to a reservoir (not shown) on the towing vehicle.

In operation, the transport device is capable of hauling the pump unit 75 to and from a pit P in the transport position shown in FIG. 1. In this position the chassis is moved forwardly over the ground on wheels 44 and 46. The hydraulic cylinder is in the retracted position so that support means 26 is pivoted by axle 28 to a generally vertical position. The arms 38 are pivoted with the axle 28 to a downward position so that the wheels engage the ground and support the chassis. When the device is backed up to opening 104 in pit P so that the pump may be inserted into the pit through the opening, the cylinder 96 is extended, causing the axle 28 to pivot with respect to the chassis 10 so that the pump unit 75 is moved from the near horizontal transport position to a generally vertical operable position illustrated in FIG. 2. At the same time that support means 26 is being pivoted downwardly, the arms 38 are pivoting upwardly so that the wheels 44 and 46 are lifted out of engagement with the ground. The weight of the transport device is now transferred from the wheels to the support means.

A complete extension of cylinder 96 causes the wheels to lift completely off the ground and the legs 48 and 50 to rest securely against the ground. In this way the pump unit is easily and surely placed in the pit P through opening 104. The stabilizing arms and tabs 66, 68 and 70, 72, respectively, are then adjusted to engage the sides of the pit opening, as shown in FIG. 3, to further stabilize the support means 26, while the trailer assumes the so called "kneeling" position, during operation of the pump.

If it is necessary to adjust the vertical position of the pump unit with respect to the chassis, or the pit, the winch 92 is actuated by a suitable means so that the shaft 76 may be raised or lowered in collar 52. The collar 80 on shaft 76 will insure that the entire pump unit does not slip from the transport device and fall into the pit, since that collar will be engaged and stopped by collar 52.

It should also be noted that an additional advantage is gained by using the described transport device, since once the pump unit has been suitably positioned in the pit and the stable platform, comprised of support means 26 and the arms and tabs 66, 68 and 70, 72, is formed, the chassis may be unhitched from the towing vehicle and the cylinder 96 retracted to pivot the chassis upwardly to an out of the way to vertical position (not shown). In this way, the tires are off the ground and the hitch assembly is vertically disposed resulting in a minimum of parts on the ground area and yet with adequate support for the pump.

While this invention has been described in connection with a single embodiment, it will be understood that these embodiments are capable of modification and that this application is intended to cover any variations, uses, or adaptations following, in general, the principles of the invention and including such departures from the present disclosure as come within known or customary practice in the art to which the invention pertains, and as fall within the scope of the invention or the limits of the appended claims.

I claim:

1. A transport device comprising:
   a chassis structure;
   means mounted on said chassis structure for supporting a pump unit, said supporting means includes an axle pivotally mounted horizontally with respect to said chassis, outwardly extending leg means fixed by one end to said axle, and collar means fixed to said leg means at the outward end thereof and engageable with said pump unit;
   means fixed to said support means for mounting wheels thereon and adapting said chassis structure to move over the ground; and
   means operably connected to said support means for pivoting said support means relatively to said chassis structure whereby said support structure is movable between a transport position and an operative position.

2. A transport device, as recited in claim 1, wherein said wheel mounting means comprises a pair of arm members fixed in spaced apart relation to said axle and extending radially outwardly therefrom, horizontally extending stub shafts fixed to the radial outer end of each of said arm members and wheels rotatably mounted on each of said stub shafts.

3. A transport device, as recited in claim 1, wherein said support means further comprises winch means mounted on said axle, a pulley mounted on said collar means and cable means extending between said winch, said pulley and said pump unit whereby operation of said winch will cause raising and lowering of said pump unit with respect to said chassis structure when said support means is in said operative position.

4. A transport device, as recited in claim 1, wherein collar means is provided with a plurality of radially extending stabilizing arms and said means for pivoting said support means comprises a hydraulic cylinder operatively connected between said chassis and said support means.

5. A transport device, as recited in claim 4, wherein said hydraulic cylinder is operatively connected between said chassis and said axle.

6. A transport device comprising:
   a chassis structure;
   means mounted on said chassis structure for supporting a pump unit, said supporting means including an axle pivotally mounted horizontally about said chassis, outwardly extending leg means fixed by one end to said axle, and a collar means fixed to said leg means at the outward end thereof and engageable with said pump unit;

means fixed to said support means for for mounting wheels thereon, said wheel mounting means comprises a pair of arm members fixed in spaced apart relationship to said axle and extending radially outwardly therefrom, horizontally extending stub shafts fixed to the radial outer end of each of said arm members, and wheels rotatably mounted on each of said stub shafts; and means operably connected to said support means for pivoting said support means relative to said chassis structure whereby said support structure is movable between a transport position and an operative position.

7. A transport device, as recited in claim 6, wherein said support means further comprises winch means mounted on said axle, a pulley mounted on said collar means, and a cable extending between said winch means, said pulley, and said pump unit whereby operation of said winch will cause raising and lowering of said pump unit with respect to said chassis structure when said support means is in said operative position.

8. A transport device, as recited in claim 7, wherein said means for pivoting said support means comprises a hydraulic cylinder operatively connected between said chassis and said support means.